United States Patent Office 3,135,661
Patented June 2, 1964

3,135,661
BACTERIA FREE DRIED SMALLPOX VACCINE
Pasquale Fiore Bartell, Broomall, and Howard Tint, Havertown, Pa., and Stephen Frank Colalongo, Woodbury Heights, N.J., assignors to American Home Products Corporation, New York, N.Y., a corporation of Delaware
No Drawing. Filed June 30, 1961, Ser. No. 120,972
3 Claims. (Cl. 167—78)

This invention relates to the preparation of smallpox vaccine, or vaccinia virus. More particularly it relates to the preparation of dried vaccine which is easily reconstituted, has unusually good stability in the dry state, and has very low bacterial content.

It has been known for many years, of course, that humans can be protected from smallpox by deliberately giving them an infection of cowpox virus. By means not yet fully understood, the human body, if not already immune to smallpox infection, reacts to the introduced cowpox (vaccinia) virus by elaborating antibodies which give effective protection from the much more virulent smallpox virus. The protection afforded by smallpox vaccination is so effective and so safe that vaccination is routinely performed on almost all persons.

Vaccinia virus for use in preventing smallpox has been cultured in several organisms and even by tissue culture methods, but many authorities appear to believe that domestic cattle are preferable for production of this virus. Accordingly, the common procedure is to infect a healthy young heifer intracutaneously with vaccinia and allow growth of the virus for a period of about six days, at the end of which period the lymph-filled blisters at the point of infection are scraped off and worked up to produce vaccine. These scrapings from the vaccinated heifer are referred to as "calf pulp."

The calf pulp contains the desired vaccinia virus; it also contains bovine cellular tissue and, in spite of employment of the most careful techniques, usually contains varying amounts of hair, dirt, and a large bacterial population. Further processing steps must be directed to reducing the bacterial count and freeing the product of other contaminants while preserving the activity of the vaccinia virus. Vaccine containing more than 1000 bacteria/ml. is not considered acceptable under currently prevailing standards.

A common method of producing vaccine from calf pulp is to grind it in a glycerinated sodium chloride solution (50% glycerine, 0.85% sodium chloride, balance water containing 1.0% phenol), filtering through bolting cloth, then storing until the bacterial content is reduced to an acceptable level. Very acceptable vaccine can be made in this way, but it has been found that in many cases the virus activity is lost or greatly reduced by the time the bacterial content has been reduced sufficiently. Furthermore, vaccines produced this way are quite unstable and are not considered effective if stored more than three months even in the deep-freeze.

In attempts to improve vaccine processing, various expedients have been tried. Antibiotics, including penicillin, streptomycin, chlortetracycline, tyrothricin, dihydrostreptomycin, oxytetracycline and chloramphenicol have been employed to reduce bacterial counts; results have been at best inconsistent, and some workers have found only temporary inhibition of bacterial growth by the antibiotics; after exhaustion or destruction of the antibiotic, bacterial growth resumed, making such vaccines unsafe. In the attempt to produce vaccines of greater storage stability, recourse has been had to dried vaccines which could be reconstituted by addition of fluid immediately before use; this has had a measure of success, and products of this type have been produced which could be kept for six months at 0° C. without serious loss of potency.

However, prior to the present invention, there has not been available a dependable means by which a readily reconstitutable dried smallpox vaccine storable at room temperature for as long as two years could be prepared. This invention provides such a method which additionally can make use of calf pulps heavily contaminated with bacteria, pulps which would hitherto have been considered completely unsuitable for vaccin preparation.

We have discovered that a combination process in which a buffered suspension of vaccinia virus is treated with antibiotics for a day or two and then frozen results in production of a vaccine of high potency and extremely low, or even zero bacterial content. Neither step alone will consistently reduce bacterial infection to a sufficiently low level, and it is not known exactly why the combination is so effective. Apparently, however, the antibiotic in some way conditions the bacteria so that they are destroyed by the subsequent freezing.

Accordingly, our process of making vaccine comprises the following steps:

(1) Blending a harvested calf pulp with a suitable aqueous suspension medium (preferably a phosphatecitric acid buffer having a pH of about 7.2) and centrifuging the resulting suspension to separate macroscopic particles, leaving the virus in the supernatant liquid; preferably, the sediment is re-suspended and again settled to obtain additional virus in a second supernatant layer of buffer.

(2) Adding antibiotics to the clarified virus suspension obtained by step 1, and allowing antibiotic action to continue for a day or so.

(3) Centrifuging at high speed to separate the virus from the antibiotic-containing supernatant liquid.

(4) Resuspending the sediment in buffer containing also a high molecular weight solid such as peptone.

(5) Freezing the suspension prepared in step 4.

(6) Vacuum-drying the frozen vaccine to produce a dry (lyophilized) preparation or, alternatively, thawing it for use as a vaccine.

As above pointed out, phenol is often used in vaccine making to reduce the bacterial count. We also sometimes incorporate phenol treatment into our process, especially when used calf pulps of unusually high bacterial content. The particular stage at which phenol treatment is effected is not critical; ordinarly, if phenol is to be used, we add it before the antibiotics are added in step 2.

The following examples illustrate our invention. In these examples, the expression "buffer solution" means an 0.004 M phosphate-citric acid buffer having a pH of 7.2. It is prepared as follows: A buffer concentrate is first made by dissolving 24.70 g. of anhydrous dibasic sodium phosphate and 2.18 g. of citric acid in enough distilled water to make a total volume of 1000 ml. Dilution of one part of this buffer concentrate to 42.5 volumes with distilled water gives the buffer solution of the examples.

*Example 1*

1776 grams of calf pulp is mixed with 5328 ml. of cold (4° C.) buffer solution and the mixture is blended for three minutes in a high speed blender. The blended material is clarified by centrifuging in the cold room (4° C.) for 15 minutes at a relative centrifugal force (RCF) of 1000. The supernatant liquid is set aside and the sedimented pulp is again blended with 5328 ml. of cold buffer solution and again clarified by centrifuging at 1000 RCF for 15 minutes. This twice extracted sediment is then discarded so far as the process of this invention is concerned, but may be used, if desired, to yield the conventional glycerinated vaccine. The combined supernates are clarified by further centrifuging at 1000 RCF for 15 minutes, discarding the sediment.

Phenol to a concentration of 0.5% is added to the supernatant, and phenol activity is allowed to continue at 25° C. for 48 hours. Antibiotics are then added to a final concentration as follows: polymyxin B sulfate, 100 u./ml.; neomycin sulfate, 100 mcg./ml.; dihydrostreptomycin, 200 mcg./ml. Antibiotics activity is permitted to proceed at 25° C. for 4 days. The antibiotics-treated virus suspension is then centrifuged at 0° C. for two hours at 2379 RCF. The supernatant is discarded, and the sediment is resuspended in 1776 ml. of buffer solution containing 0.25% phenol. This suspension is clarified by 15 minutes' centrifuging at 1000 RCF. The supernatant is diluted with an equal volume of 10% peptone (Bacto-Peptone, supplied by Difco Laboratories, Detroit, Michigan) in buffer solution.

Part of the vaccine is then filled into vials, frozen and lyophilized; part is filled into vials, frozen, and immediately thawed.

The lyophilized vaccine is reconstituted by adding an appropriate volume of distilled water containing 50% glycerine and 0.25% phenol.

The following table gives the bacteria counts at different stages in the above processing.

| Stage: | Viable bacteria/ml. |
|---|---|
| Starting material | $2.0 \times 10^5$ |
| After phenol treatment (0.5%, 25° C., 48 hours) | $4.0 \times 10^5$ |
| After antibiotics (25° C., 96 hours) | $2.5 \times 10^4$ |
| After lyophilization | 0 |
| After freezing and thawing | 0 |

*Example 2*

176 grams of calf pulp is blended with 528 ml. of buffer, centrifuged, reextracted, clarified, etc., as detailed in the first paragraph of Example 1.

To the clarified combined supernatants, antibiotics are added to give the following concentrations: polymyxin B sulfate, 100 u./ml.; neomycin sulfate, 100 mcg./ml.; dihydrostreptomycin, 200 mcg./ml. Antibiotics activity is permitted to proceed at 25° C. for 24 hours and then at 4° C. for another 144 hours. To the suspension is then added phenol to a concentration of 0.5%, and the mixture is then held at 25° C. for 48 hours. The mixture is then centrifuged at 0° C. for two hours at 2379 RCF. The supernatant is discarded and the sediment is resuspended in 176 ml. of buffer solution containing 0.25% phenol. This suspension is clarified by centrifuging at 1000 RCF for 15 minutes, diluted with an equal volume of 10% peptone in buffer solution, filled into vials, and frozen. Part of the frozen vaccine is vacuum-dried, and the rest is thawed. The freeze-dried vaccine may be reconstituted readily by adding distilled water containing 50% glycerine and 0.25% phenol.

The following table gives the bacterial counts at different stages in the foregoing processing.

| Stage: | Viable bacteria/ml. |
|---|---|
| Starting material | $2.0 \times 10^8$ |
| After antibiotics: | |
| 25° C., 24 hours | $4.0 \times 10^5$ |
| Then 4° C., 144 hours | $3.2 \times 10^4$ |
| After phenol (25° C., 48 hours) | $5.0 \times 10^1$ |
| After lyophilization or freeze-thaw | 0 |

*Example 3*

Twenty-five grams of calf pulp is blended with 75 ml. buffer solution, centrifuged, reextracted, and the combined supernatants clarified as detailed in the first paragraph of Example 1. Polymyxin B sulfate, 50 u./ml.; neomycin sulfate, 50 mcg./ml., and dihydrostreptomycin, 100 mcg./ml. are added and antibiotic action is allowed to proceed at 25° C. for 24 hours, then at 4° C. for an additional 144 hours. The suspension is then centrifuged at 0° C. for one hour at 1935 RCF. The supernatant is discarded and the sediment is resuspended in 75 ml. of buffer solution containing 0.25% phenol; this suspension is clarified by centrifuging at 1000 RCF for 15 minutes, and is then diluted with an equal volume of buffer solution containing 10% peptone. This suspension is then filled into containers.

The following table gives bacteria counts at the several stages of processing.

| Stage: | Viable bacteria/ml. |
|---|---|
| Starting material | $1.6 \times 10^6$ |
| Antibiotics: | |
| 25° C., 24 hours | $2.5 \times 10^4$ |
| Then, 4° C., 6 days | $1.0 \times 10^2$ |

*Example 4*

Calf pulp is processed as detailed in the first paragraph of Example 1. Antibiotics are added as follows: Polymyxin B sulfate, 50 u./ml.; neomycin sulfate, 50 mcg./ml.; and dihydrostreptomycin, 100 mcg./ml. Antibiotics activity is allowed to continue at 25° C. for 24 hours. The antibiotics-treated virus suspension is then centrifuged at 0° C. for one hour at 1935 RCF. The sediment is resuspended in 1776 ml. of buffer solution containing 0.25% phenol, and clarified by 15 minutes of centrifuging at 1000 RCF. The supernatant is diluted with an equal volume of 10% peptone in buffer solution, frozen, and lyophilized. The lyophilized material may be reconstituted by adding distilled water containing 50% glycerine and 0.25% phenol.

The following table gives the bacterial counts at various stages in the above process.

| Stage: | Viable bacteria/ml. |
|---|---|
| Starting material | $1.6 \times 10^6$ |
| After 24 hours of antibiotics action | $2.5 \times 10^4$ |
| After loyphilization or freeze-thaw | 0 |

Although the foregoing examples show the use of a phosphate buffer as the suspension medium in the several steps of our process, we have found that equally good results may be obtained if the phosphate buffer is replaced throughout by 0.85% aqueous sodium chloride or even by distilled water.

While the foregoing examples show the use of a particular combination of three antibiotics, polymyxin B sulfate, neomycin sulfate, and dihydrostreptomycin, other antibiotics may be used if desired. Those familiar with this art will realize that in obtaining calf pulp for vaccine preparation, contamination by any of a large number of bacterial varieties and strains may be encountered. Accordingly, it is obvious that in some cases a different antibiotic or antibiotic combination might be preferable. In most instances, it will be entirely satisfactory to substitute penicillin, streptomycin, chlortetracycline, bacitracin, tyrothricin, oxytetracycline or chloramphenicol for any one or for all of the antibiotics called for by the examples. The amounts of the several antibiotics shown in the examples will serve as a guide, but it will be obvious that these concentrations are not critical. In some instances lower concentrations will be adequate; with unusually contaminated calf pulp it may be desirable to use higher concentrations.

While the foregoing examples show the use of peptone as an extender or bulking agent for the solid vaccine, any other inert high molecular weight and therapeutically acceptable extender may be employed in place of peptone. Among such may be mentioned polyvinylpyrrolidone, dextran, albumen, vegetable gums, and various animal sera.

We claim:
1. A method of preparing a dry stable smallpox vaccine substantially free of viable bacteria which comprises the steps of (1) blending vaccinia virus infected calf pulp with a neutral aqueous suspension medium, (2) centrifuging the resulting blend at a relatively low cen- trifugal force to settle relatively large particles while leaving the vaccinia virus in suspension, (3) adding antibacterial antibiotics to the thus clarified virus suspension and allowing antibiotic activity to proceed for at least about one day, at a temperature of about 25° C. (4) centrifuging the antibiotics-treated virus suspension at a relatively high centrifugal force thereby causing separation of a sediment containing the vaccinia virus, (5) resuspending said sediment in a neutral aqueous suspension medium, (6) adding a high-molecular weight and therapetuically acceptable extender to the resulting virus suspension, and (7) freezing said virus suspension and vacuum drying said virus while frozen.

2. A method according to claim 1 in which the antibacterial antibiotics comprise a mixture of polymyxin B sulfate, neomycin sulfate, and dihydrostreptomycin.

3. A method according to claim 1 in which phenol to a concentration of not more than about 0.5% is added to the virus suspension at a stage prior to the centrifugation at the relatively high centrifugal force.

References Cited in the file of this patent
FOREIGN PATENTS
798,152     Great Britain  ---------- July 16, 1958

OTHER REFERENCES

Gershenfeld: Mack Publishing Co., 1945, pp. 497–498.

Mfg. Chemist, vol. 21, No. 6, June 1950, pp. 255–256.

Jackson Review, Allergy and Applied Immun., March 1957, pp. 187–188.

Williams and Williams: Textbook of Virology, 3rd ed., 1958, pp. 59–69.

Julius: Antibiotics and Chemotherapy, vol. 8, No. 6, June 1958, pp. 287–296.

Antibiotics Annual, 1958–1959, pp. 744–747.